United States Patent
Allert

[19]

[11] Patent Number: 5,909,852
[45] Date of Patent: Jun. 8, 1999

[54] HOSE CLAMP

[75] Inventor: Kurt Allert, Oberndorf, Germany

[73] Assignee: Hans Oetiker AG Maschinen-Und Apparatefabrik, Horgen, Switzerland

[21] Appl. No.: 08/995,249

[22] Filed: Dec. 19, 1997

[30] Foreign Application Priority Data

Dec. 19, 1996 [DE] Germany ............................ 196 53 005

[51] Int. Cl.⁶ ............................................................. F16L 33/08
[52] U.S. Cl. .............................. 24/279; 24/274 P; 24/19
[58] Field of Search ................................... 24/279, 274 R, 24/274 P, 20 R, 20 TT, 20 EE, 19; 285/367, 406

[56] References Cited

U.S. PATENT DOCUMENTS

| 2,189,172 | 2/1940 | Hathorn . | |
|---|---|---|---|
| 2,268,211 | 12/1941 | Hathorn . | |
| 2,381,349 | 8/1945 | Gen et al. | 24/274 P X |
| 3,175,271 | 3/1965 | Schukraft . | |
| 3,561,078 | 2/1971 | Care . | |
| 5,063,642 | 11/1991 | Toth | 24/279 X |
| 5,327,618 | 7/1994 | Chene et al. | 24/279 X |

FOREIGN PATENT DOCUMENTS

| 0 167 116 | 1/1986 | European Pat. Off. . |
| 1 484 749 | 9/1967 | France . |
| 2204235 | 10/1972 | France . |
| AS 1256014 | 8/1962 | Germany . |
| AS 1261717 | 6/1965 | Germany . |
| OS 1575285 | 3/1967 | Germany . |
| 1 249 030 | 8/1967 | Germany . |
| 1 256 014 | 12/1967 | Germany . |
| GM 7012732 | 4/1969 | Germany . |
| OS 1939414 | 8/1969 | Germany . |
| GM 7217340 | 5/1971 | Germany . |
| 28 54 675 | 3/1980 | Germany . |
| 3523063 | 6/1985 | Germany . |
| 607598 | 9/1948 | United Kingdom ................... 24/274 P |

Primary Examiner—Anthony Knight
Assistant Examiner—Robert J. Sandy
Attorney, Agent, or Firm—Darby & Darby

[57] ABSTRACT

The invention relates to a hose clamp with a U-shaped lower housing, wherein an end section of a tightening strap is secured to the bottom of the lower housing, and with an upper housing which is pivotally supported in the lower housing for engaging or disengaging a worm drive with the other end region of the tightening strap, wherein the worm drive is supported in the upper housing such as to permit rotation, but no substantial axial movement, and wherein the upper housing comprises mounting tabs formed as one piece which engage or are capable of engaging, respectively, from the inside of the lower housing with recesses in side walls forming the legs of the U-shaped lower housing. It is provided that the upper housing (5)—when viewed in transverse cross section of the worm drive—partially encloses (partial enclosure contour 46) the worm drive (7), and that the mounting tabs (55, 56) originate from front edges (47) of the formed partial enclosure contour (46), with the front edges (47) forming lateral edges (48) of the upper housing (5) and extending at least approximately in the longitudinal direction of the worm drive.

10 Claims, 2 Drawing Sheets

HOSE CLAMP

BACKGROUND OF THE INVENTION

1. Field of the Invention

The present invention relates to a hose clamp with a U-shaped lower housing, wherein an end section of a tightening strap is secured to the bottom of the lower housing, and with an upper housing which is pivotally supported in the lower housing for engaging or disengaging a worm drive with the other end region of the tightening strap, wherein the worm drive is supported in the upper housing such as to permit rotation, but no substantial axial movement, and wherein the upper housing comprises mounting tabs formed as one piece which engage or are capable of engaging, respectively, from the inside of the lower housing with recesses in side walls forming the legs of the U-shaped lower housing.

2. Description of the Related Art

A hose clamp of his type is described in the European Patent 0 167 116, wherein the upper housing with the worm drive can be swung open when the hose clamp is installed. The end of the tightening strap can then be inserted into the lower housing in a simple manner and to the desired length. The upper housing is subsequently completely rotated into the lower housing and locked in an end position. Rotation as well as locking is aided by mounting tabs which are constructed as a single piece with the upper housing. For locking the end position, the mounting tabs are pivotally supported in or can be engaged in respective recesses in the legs of the U-shaped lower housing. If a hose clamp has to be removed after it is already installed and tightened, then the tightening strap is first released by turning the worm drive; thereafter, the upper housing is rotated relative to the lower housing causing the helical gears of the worm drive to release respective meshing slots of the associated tightening strap, so that the tightening strap can be pulled out of the lower housing and the hose clamp can be removed. Although the known hose clamp is of proven design, it is desirable to further improve the tensioning force of the known hose clamp.

SUMMARY OF THE INVENTION

It is therefore an object of the invention to provide a hose clamp of the above type, which is designed—as previously described—to swing open for simple installation and removal and which is capable of generating large tensioning forces.

This object is solved by the invention in that the upper housing—when viewed in transverse cross section of the worm drive—partially encloses the worm drive and that the mounting tabs emanate from front edges of the formed partial enclosure contour. The front edges form lateral edges of the upper housing and extend at least approximately in the longitudinal direction of the worm drive. This design provides a upper housing which is simple to manufacture due to its one-piece construction. Moreover, the housing is extremely rigid because the partial enclosure contour of the upper housing overlaps the tensioning worm, with the overlap depending on the selected partial enclosing angle. Finally, the mounting tabs protrude from the front edges of the partial enclosure contour—as a single piece. The front edges run parallel to the worm drive, whereas the mounting tabs extend from these front edges transversely, preferably perpendicular, to the length of the worm drive so as to be able to mesh with respective recesses in the lower housing. When viewed along of the worm drive, the mounting tabs are oriented in such a way that their lateral faces contact respective lateral surfaces of the aforedescribed openings in the lower housing when a force is applied to the tightening strap for tightening the clamp. The lateral faces have the same thickness as the sheet metal of the upper housing. Consequently, the upper housing together with the worm drive to which the tensioning force is applied, are not supported in the direction of the surface normal of the sheet metal—as is the case for conventional clamps (EP 0 176 116)—, but rather perpendicular to the surface normal; in this way, extremely large forces can be sustained while the affected components undergo only elastic or at most insignificant plastic deformation. With the design of the invention, the mounting tabs are it is most advantageously located in relatively close proximity to the bottom of the lower housing, since the upper housing partially enclosing the worm drive, while one end region of the tightening strap is secured to the bottom. The other end region of the tightening strap meshes with the worm gear and transmits the force through the upper housing to the mounting tabs which in turn transmit the force to the lower housing. As a result of the small distance and therefore small lever arm between the mounting tabs and the housing bottom, the resultant torque is relatively small. This feature also significantly improves the capability of the hose clamp of the invention to absorb large tensioning forces. Although the design features a swing-out housing, the hose clamp is of simple construction with a low contact point for the force and cost-effective.

The upper housing and the lower housing are preferably manufactured from sheet metal by punching, bending and/or stamping.

In a further improvement of the invention, the partial enclosure contour is shaped to match at least approximately the peripheral contour of the cross section of the worm drive. Matching the shape of the worm drive, in particular its circular circumference, results in a relatively compact design which effectively resists torsion and bending forces and thus enhances the ability of the hose clamp to absorb large forces.

The mounting tabs can also be located at about the same height as the rotational axis of the worm drive. As mentioned above, the torque exerted on the hose clamp housing by the two ends of the tightening strap is decreased by the relatively low position of the mounting tabs. According to the foregoing design, the mounting tabs can be located "approximately" on the same height as the rotational axis, thus providing flexibility as to their exact position. Their position can be somewhat above or somewhat below the rotational axis by about half the diameter of the worm drive. The aforementioned torque becomes smaller when the spatial separation between the mounting tabs and the housing bottom is decreased. The height of the mounting tabs with respect to the worm drive defines the enclosing angle, wherein a larger enclosing angle of the upper housing relative to the worm drive is possible when the mounting tabs are located rather low.

According to a further improvement of the invention, each of two mounting tabs facing each other across the rotational axis, engages with a respective recess formed as an angular slot. Through the angular slots, the upper housing can be initially displaced parallel to the axis of the worm drive with respect to the lower housing. The mounting tabs are here displaced within first slot sections of the angular slots, wherein the first slot sections are oriented approximately parallel to the bottom of the lower housing. In order to open the hose clamp, the mounting tabs are then moved to second slot sections of the angular slots, permitting the upper housing to be tilted relative to the lower housing. The second slot sections extend transversely, preferably perpendicular, to the first slot section in the direction of the free ends of the legs of the U-shaped lower housing.

Advantageously, two additional mounting tabs facing each other across the rotational axis engage with a respective one of the recesses which have the lateral openings. The open design of the recesses allows the respective mounting tabs to be detached from the recesses when the hose clamp is opened, and to be reinserted into the recesses when the hose clamp is to be closed. These recesses with lateral openings are preferably located proximate to the front face of the legs of the U-shaped lower housing.

Advantageously, the end region of the tightening strap which can be fastened to the housing bottom, can also comprise an opening for overriding the worm drive. With this opening for overriding the worm drive, the threads of the worm drive are able to mesh to a considerable depth with meshing slots on the other strap end disposed above. This design again allows the hose clamp of the invention to absorb large forces. Moreover, the opening for overriding the worm drive permits a rather low position of the worm drive, i.e. very close to the bottom of the lower housing.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

DETAILED DESCRIPTION OF THE PRESENTLY PREFERRED EMBODIMENTS

Figure 1:
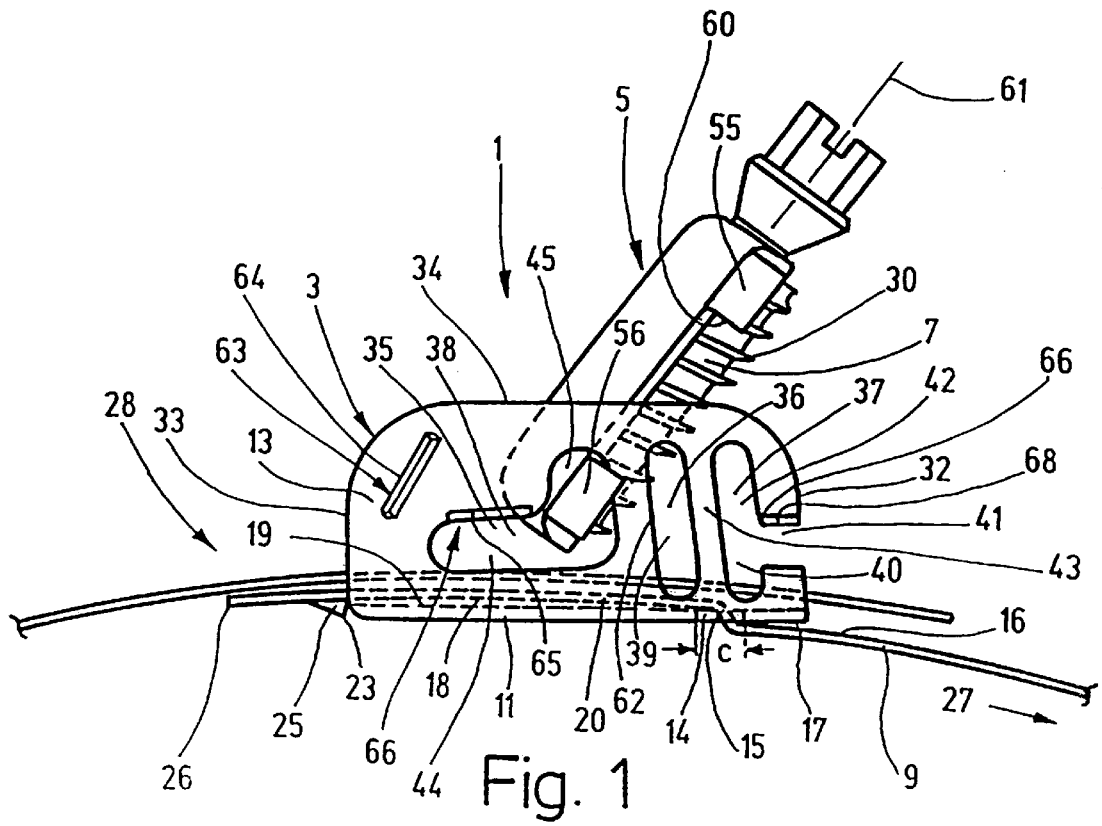
FIG. 1 a side view of a hose clamp with the upper housing swung open.

Referring now to FIG. 1, there is shown a hose clamp 1 comprised of a lower housing 3, an upper housing 5, a worm drive 7 and a tightening strap 9. The lower housing 3 has a housing bottom 11 with side walls 13 extending therefrom at right angles, thereby forming a U-shaped lower housing 3 (see in particular FIG. 4). The lower housing 3 is thus formed as a single unit.

The housing bottom 11 is penetrated by a transverse slot 14 forming an opening for receiving the tightening strap 9. As illustrated in FIG. 4, the transverse slot 14 extends across the entire width b inside the U of the housing bottom 11. The slot width c (FIG. 1) is selected such as to accept a portion of the tightening strap 9 provided with a right-angle bend 15. The top side 16 of the tightening strap 9 abuts the underside 17 of the housing bottom 11 and the underside 18 is supported inside the lower housing 3 by the interior surface 19 of the housing bottom 11. Consequently, one end region 20 of the tightening strap 9 is attached to the lower housing 3. On the end of the housing bottom 11 opposite from the transverse slot 14, there is formed as a single piece a locking tongue 21 (FIG. 3) which overlaps with its free end 22 the lateral edge of an opening 24 for overriding the worm drive.

The opening 24 for overriding the worm drive is formed in the portion of the tightening strap 9 which is located inside the lower housing 3. The locking tongue 21 is preferably located in the plane of the housing bottom 11. The overlap referred to above is then created by bending the tightening strap 9 downwards near the lateral edge 23 (reference number 25 in FIG. 1). Following the tightening strap 9 from one of its ends, the tightening strap 9 first extends through the inside of the lower housing 3, then continues with the right-angle bend 15 through the transverse slot 14, proceeding further—in the direction of the arrow 27 (FIG. 1)—around an object (not shown). Finally, the other end region 28 is superimposed with the first end region 20 in the region of the hose clamp 1. The end region 28 is provided with meshing slots 29 for the worm gear 30 of the worm drive 7.

The role of the side walls 13 forming the legs of the U-shaped lower housing 3 will be discussed hereinafter in greater detail. The two side walls 13 are formed mirror-inverted with respect to an imaginary longitudinal center plane 31 normal to the top surface 16 of the strap 9. For this reason, the design of only one of the two side walls 13 win be discussed. The side wall 13 includes, as illustrated in FIG. 1, a front edge 32 located at that end of the lower housing 3 where the attached end section 20 of the tightening strap 9 begins. A forward edge 33 facing away from the front edge 32 is disposed at the other end of the lower housing 3. An upper edge 34 of the side wall 13 extends parallel to the underside 17 of the housing bottom 11. Three recesses 35, 36 and 37 extend through the side wall 13, with the recess 35 formed as an angular slot 38, the recess 36 forming a longitudinal slot 39, and the recess 37 formed as a recess 40 with a lateral opening. The lateral opening in the recess 37 is created by a slot 41 merging with recess 37, with the slot 41 starting at the front edge 32 of the side wall 13. Recess 37 is essentially constructed in form of a longitudinal slot 42, whereby an indicator rib 43 is created between the two recesses 36 and 37 for indicating the tensioning force. The indicator rib 43 extends approximately normal to the plane of the housing bottom 11, with the top end of the indicator rib 43 preferably slightly inclined towards the forward edge 33.

The angular slot 38 has a first slot section 44 extending approximately parallel to the lower housing 11 and a second slot section 45 extending transversely to the first slot section 44. The first slot section 44 points—when viewed from the corner region of the angular slot 38—towards the forward edge 33; correspondingly, the second slot section 45 points towards the top edge 34 of side wall 13.

The upper housing 5 is—when viewed in transverse cross section of the worm drive—formed as an arc, i.e. the upper housing 3 partially encircles the worm drive 7. This is seen clearly from FIG. 4. Because the worm drive 7 is partly enclosed, a partial enclosure contour 46 is formed by the upper housing 5. The partial enclosure contour 46—when viewed lengthwise along the worm drive 7—has front edges 47 which form lateral edges 48 of the upper housing 5. The upper housing 5 further includes a first front face 49 and a second front face 50. The front faces 49 and 50 are provided with bearing openings 51 which are open to the side, for supporting bearing sections 52 of the worm drive 7 for rotation. A small clearance zone 54 (FIG. 4) is provided between the underside 53 of the upper housing 5 and the worm gear 30 of the worm drive 7. According to another embodiment (not shown), the worm gear 30 can also abut the underside 53 of the upper housing 5.

Mounting tabs 55 and 56 extend from the lateral edges 48 of the upper housing 5 next to the front walls 49 and 50, with the two mounting tabs 55 located opposite from each other with respect to the imaginary longitudinal center plane 31. The two mounting tabs 56 are arranged in a similar fashion. The mounting tabs 55 are associated with the front wall 50, whereas the mounting tabs 56 are associated with the front wall 49. The mounting tabs 55 and 56 extend radially relative to the cylindrical worm drive 7, with the planes of the mounting tabs oriented approximately parallel with the housing bottom 11. The two mounting tabs 56 penetrate the angular slots 38; the two mounting tabs 55 can be inserted into the slots 41 and thus also into the recesses 37 when the upper housing 5 is in a proper position. This will be discussed later in greater detail. It is apparent from FIG. 4 that the mounting tabs 55 and 56 have angled end regions 57 pointing towards the housing bottom 11 and extending— forming a gap therebetween—to the outsides 58 of the side walls 13.

Abutting one of the bearing sections 52 of the worm drive 7, there is provided an actuating head 59. The actuating head 59 consequently abuts the front wall 50 of the upper housing 5 and includes means for inserting a tool, such as a slot for a screwdriver blade and/or a polygonal design for receiving a socket wrench or the like.

In the following, the reinforcement components introduced in the side wall 13 will be described in greater detail.

Referring again to FIG. 1, each side wall 13 includes an embossed section 63 which is formed as a protrusion 64 and pressed from the inside out, i.e., the respective outside portion 67 of side wall 13 is raised. The protrusion 64 extends essentially along an imaginary line between the forward edge 33 and the top edge 34. Alternatively, the protrusion 64 can also extend parallel or approximately parallel to the top edge 34 or to the forward edge 33.

Moreover, the top marginal edge 65 of the first slot section 44 of the angular slot 38 is provided with an embossed reinforcement edge 66. An embossed reinforcement edge 66 is also formed on the upper terminal edge 68 of slot 41. The cross-section of the embossed reinforcement edge 66 is seen clearly on the left side wall 13 in FIG. 4. The embossed reinforcement edge 66 is formed by upsetting the material from the outside 67 which decreases the sheet metal thickness. It should be pointed out that—for sake of simplicity— two different embodiments of the reinforcement components are depicted in FIG. 4. As mentioned before, the embossed reinforcement edge 66 is formed on the left side wall. In the first embodiment, both side walls 13 include reinforcement edges 66. In the second embodiment, each side wall 13 is provided with a bevel 69, as illustrated in FIG. 4 on the right side wall 13. The same reasoning applies to FIG. 3.

The bevel 69 is formed by excess material 70 bent away from the side wall 13. The excess material 70 is obtained— both in the region of the angular slot 38 and in the region of the slot 41—by free punching during stamping of the angular slot 38. The free punched tab is then bent outwardly, preferably by 90°, thereby creating the excess material 70. The excess material 70 at slot 41 is created by bending the top edge of slot 41 outwardly, preferably also by 90°.

In the first embodiment of the reinforcement components depicted in the Figures, the mounting tabs 56 on the upper hose clamp housing 5 are supported by the embossed reinforcement edge 66 of the angular slot 38, whereas the mounting tabs 55 on the upper housing 5 are supported by an additional embossed reinforcement edge 66 of slot 41. Since the embossed reinforcement edges 66 enhance the mechanical strength of the material, large forces can be transmitted by the mounting tabs 55 and 56 without causing deformation of the side walls 13.

If the material is reinforced through the bevels 69, then the surface pressure between the mounting tabs 55 and 56 and the excess material 70 is reduced as a result of the increased contact area between the individual components.

The presence of the protrusion 64 on the side walls 13 permits a reduction in sheet metal thickness of the lower housing 3 of the hose clamp 1, resulting in savings in material and also reduced cost. The same reasoning applies to the embodiment incorporating the embossed reinforcement edge 66 or the bevel 69.

The device operates as follows: It is assumed that the hose clamp 1 is initially in the open position, i.e. the upper housing 5 is swung relative to the lower housing 3 into the position shown in FIG. 1, wherein the worm drive 7 does not engage the tightening strap 9. The tightening strap 9 is placed around an object (not shown) and subsequently the end region 28 is inserted into the lower housing 3 in the manner illustrated in FIG. 1. From the position shown in FIG. 1, the upper housing 5 is then rotated downwardly to engage with the lower housing 3. During this rotation, the mounting tabs 56 slide out of second slot sections 45 of the two angled slots 38 and enter the first slot sections 44.

The two mounting tabs 55 move with their lateral edges 60 past the front edge 32 and enter the slots 41. The upper housing 5 then moves towards the forward edges 33 of the lower housing 3, until the two lateral edges 60 contact the tensioning force indicator rib 43. During manipulation of the tightening strap 9, the upper housing could slightly move relative to the lower housing, since the hose clamp 1 is not yet securely fastened. After the above installation step is completed, the individual components of the hose clamp 1 are in the position depicted in FIG. 2. In this position, the worm gear 30 engages the meshing slots 29, possibly to a considerable depth, since the opening 24 for overriding the worm drive can accommodate a rather low position of the worm drive, i.e. a small separation between the longitudinal center axis 61 of the worm drive 7 and the housing bottom 11.

In subsequent installation steps, the worm drive 7 is turned clockwise with a tool, whereby the tightening strap 9 is tightened and formfittingly surrounds the object. The tensioning force is transmitted to the housing bottom 11 of the lower housing 3 where the end region 20 of the tightening strap is attached—as described above. The other end region 28 of the tightening strap 9 cooperates with the worm drive 7 via meshing slots 29, i.e. at that respective point, the tensioning force is transmitted to the worm drive 7 and subsequently to the mounting tabs 55. The lateral edges 60 of the mounting tabs 55 are supported on the tensioning force indicator ribs 43. Since the tensioning force indicator ribs 43 become plastically deformed when the hose clamp 1 is tightened, this deformation is a measure for the tensioning force, i.e. the tensioning force indicator ribs 43 indicate the tensioning force applied by the hose clamp 1. The deformation can be so large that the tensioning force indicator ribs 43 make contact with the opposite lateral edges 62 of the recesses 36.

Figure 2:
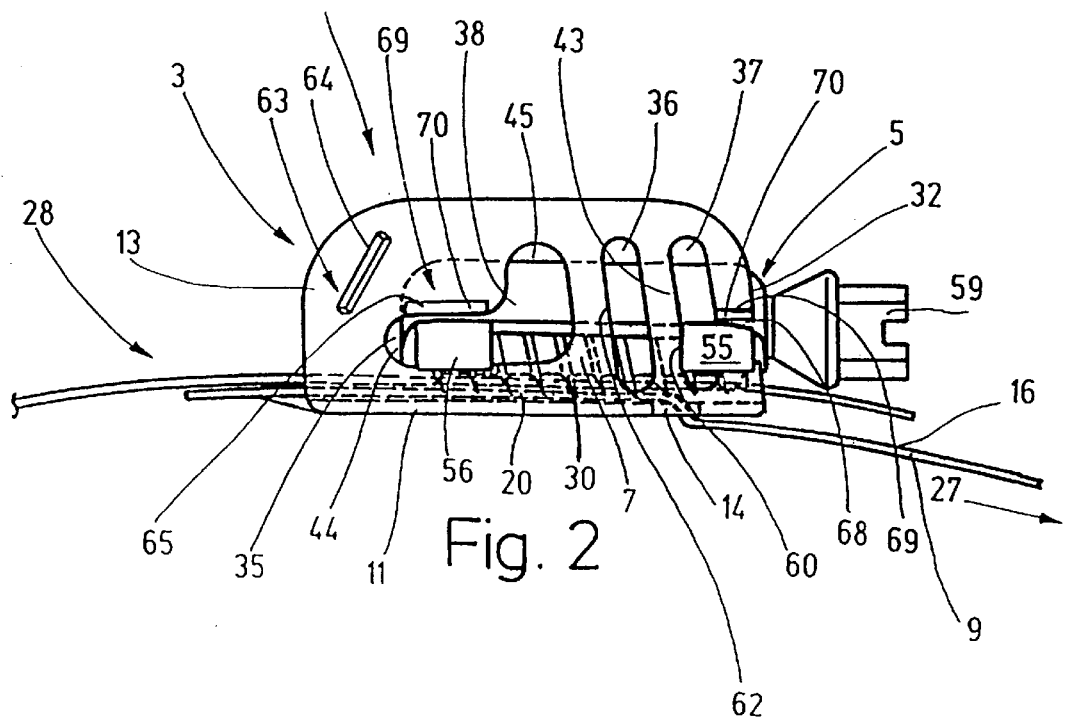
FIG. 2 a side view of the hose clamp with the upper housing locked in the operating position, FIG. 3 a top plan view of the hose clamp of FIG. 2, and FIG. 4 a cross-sectional view taken along the line 4—4 of FIG. 3.
Figure 3:
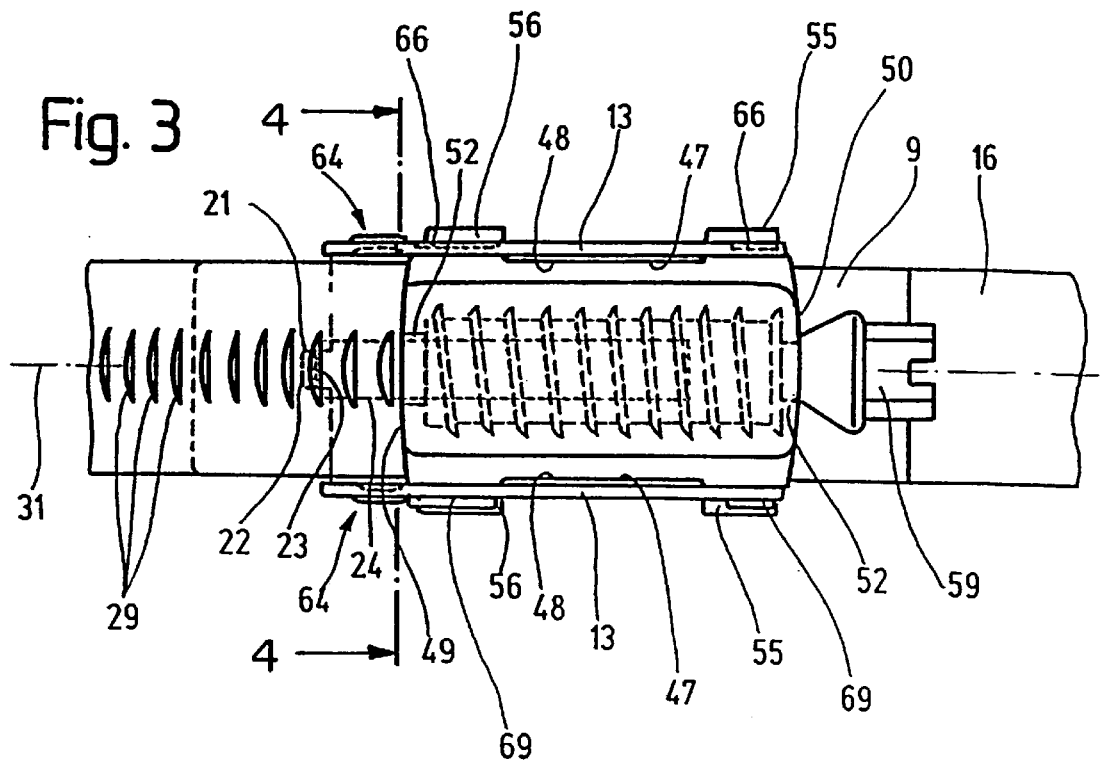
Figure 4:
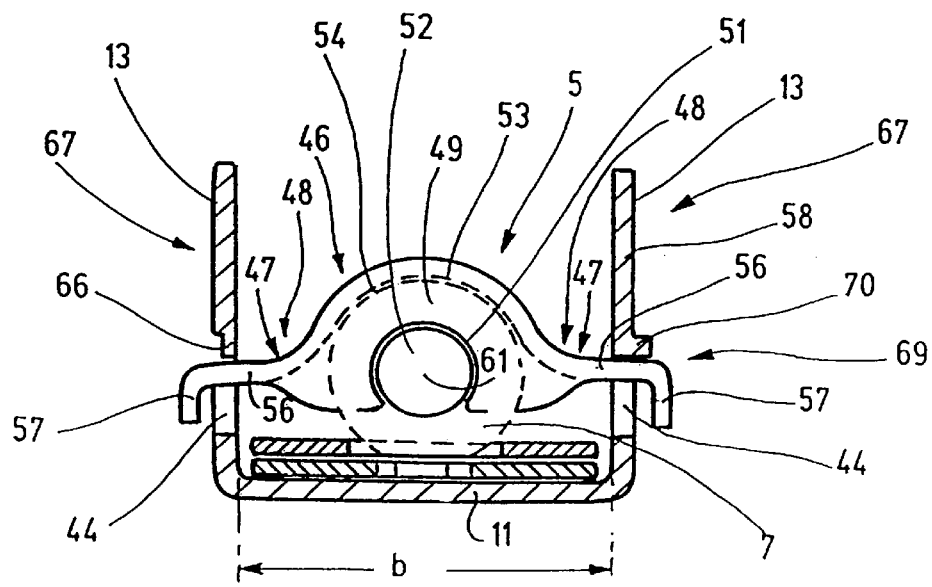

More particularly, FIGS. 2 and 3 show that the mounting tabs 55 and also the mounting tabs 56 are located rather close to the housing bottom 11. This arises from the fact that the mounting tabs 55 and 56 are located approximately at the height of the longitudinal center axis 61 of the worm drive 7. It is apparent that—depending on the encircling angle formed by the upper housing 5 around the worm drive 7—the position of the mounting tabs 55 and 56 is somewhat lower or higher. When the position of the mounting tabs 55 and 56 is lowered, the spatial separation between the force contact points and the housing bottom 11 decreases, resulting in a decrease in the applied torque when the hose clamp 1 is tightened. Consequently, the hose clamp 1 of the invention is capable of generating extremely large tensioning forces.

According to a further improvement of the invention, the mounting tabs 55 are not only able to make contact with respective parts of the lower housing when the hose clamp 1 is fully tightened, but the lower housing 3 in addition supports the mounting tabs 56 on their respective lateral edges, thereby making the attachment even stronger; in this situation, however, the tensioning force indicator ribs 43 will indicate inaccurate readings.

For removal of the hose clamp of the invention after installation, the worm drive 7 only has to be turned in the release direction. As soon as the tightening strap 9 is sufficiently loosened, the mounting tabs 55 are pulled out of the slots 41 and the unit can be opened, thereby attaining again the position illustrated in FIG. 1. In this position, the end region 28 of the tightening strap 9 can then simply be pulled out of the lower housing 3, since the worm drive 7 is no longer engaged.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results ire within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A clamp having:
   a U-shaped lower housing having a bottom, and side walls which form legs of the U-shaped lower housing, the side walls having recesses;
   a tightening strap having a one and another end section, the one end section secured to the bottom of the lower housing;
   an upper housing having one-piece mounting tabs (55, 56) capable of engaging from the inside of the lower housing the recesses in the side walls of the lower housing, and further having front edges (47) which form lateral edges (48) of the upper housing;
   a worm drive supported in the upper housing to permit rotation thereof, but no substantial axial movement thereof, the upper housing pivotally supported in the lower housing for engaging or disengaging the worm drive with the other end section of the tightening strap, the front edges extending at least approximately parallel to the longitudinal direction of the worm drive;
   wherein the upper housing forms a contour which at least partially encloses the worm drive, and further wherein the mounting tabs originate from the front edges of the upper housing.

2. The clamp according to claim 1, wherein the partial enclosure contour of the upper housing is shaped as to match at least approximately the peripheral contour of the cross-section of the worm drive.

3. A clamp having:
   a U-shaped lower housing having a bottom, and side walls which form legs of the U-shaped lower housing, the side walls having recesses;
   a tightening strap having a one and another end section, the one end section secured to the bottom of the lower housing;
   an upper housing having one-piece mounting tabs (55, 56) capable of engaging from the inside of the lower housing the recesses in the side walls of the lower housing, and further having front edges (47) which form lateral edges (48) of the upper housing and wherein the mounting tabs are located at approximately the same height as the rotational axis (61) of the worm drive;
   a worm drive supported in the upper housing to permit rotation thereof, but no substantial axial movement thereof, the upper housing pivotally supported in the lower housing for engaging or disengaging the worm drive with the other end section of the tightening strap, the front edges extending at least approximately parallel to the longitudinal direction of the worm drive;
   wherein the upper housing forms a contour which at least partially encloses the worm drive, and further wherein the mounting tabs originate from the front edges of the upper housing.

4. The clamp according to claim 3, wherein each of the mounting tabs (56), which are located opposite each other with respect to the rotational axis, engage with a respective recess (35) formed as an angular slot (38).

5. The clamp according to claim 4, wherein each angular slot (38) has a first slot section (44) extending approximately parallel to the lower housing and a second slot section (45) extending transversely to the first slot section.

6. The clamp according to claim 3, wherein each of the two mounting tabs (55), which are located opposite each other with respect to the rotational axis, engage with a respective recess (37, 40) which includes a lateral opening.

7. The clamp according to claim 6, wherein the respective recesses (37, 40) are formed at front edges (32) of the lower housing.

8. A clamp having:
   a U-shaped lower housing having a bottom, and side walls which form legs of the U-shaped lower housing, the side walls having recesses;
   a tightening strap having a one and another end section, the one end section secured to the bottom of the lower housing, the one end section comprises an opening (24) for overriding the worm drive;
   an upper housing having one-piece mounting tabs (55, 56) capable of engaging from the inside of the lower housing the recesses in the side walls of the lower housing, and further having front edges (47) which form lateral edges (48) of the upper housing;
   a worm drive supported in the upper housing to permit rotation thereof, but no substantial axial movement thereof, the upper housing pivotally supported in the lower housing for engaging or disengaging the worm drive with the other end section of the tightening strap, the front edges extending at least approximately parallel to the longitudinal direction of the worm drive;
   wherein the upper housing forms a contour which at least partially encloses the worm drive, and further wherein the mounting tabs originate from the front edges of the upper housing.

9. The clamp according to claim 1, wherein the side walls of the lower housing have reinforcement protrusions (64).

10. The clamp according to claim 1 wherein the mounting tabs (55, 56) receive support from embossed edges (66) or edges (69) on angular slots (38), respectively.

* * * * *